United States Patent
Cande

[19]

[11] Patent Number: 6,102,336

[45] Date of Patent: Aug. 15, 2000

[54] PASSIVE DEVICE FOR STABILIZING THE DIRECTION IN WHICH A SPACECRAFT POINTS

[75] Inventor: Jacques Cande, Den Haag, Netherlands

[73] Assignee: Agence Spatiale Europeenne, Paris, France

[21] Appl. No.: 09/100,252

[22] Filed: Jun. 19, 1998

[30] Foreign Application Priority Data

Jun. 25, 1997 [FR] France .................................. 97 07917

[51] Int. Cl.⁷ .................................................. B64G 1/24
[52] U.S. Cl. ..................... 244/168; 244/158 R; 244/173; 136/292
[58] Field of Search .................................. 244/173, 168, 244/165, 164, 158 R; 136/245, 246, 292

[56] References Cited

U.S. PATENT DOCUMENTS

| | | | |
|---|---|---|---|
| 3,057,579 | 10/1962 | Cutler et al. | 244/168 |
| 3,239,165 | 3/1966 | Sohn | 244/168 |
| 3,304,028 | 2/1967 | Dryden | 244/168 |
| 4,325,124 | 4/1982 | Renner | 244/164 |
| 5,133,518 | 7/1992 | Flament | 244/173 |
| 5,310,144 | 5/1994 | Salvatore et al. | 244/168 |
| 5,697,582 | 12/1997 | Surauer et al. | 244/168 |
| 5,775,645 | 7/1998 | Yocum, Jr. et al. | 244/168 |

FOREIGN PATENT DOCUMENTS

| | | |
|---|---|---|
| 0 436 425 | 7/1991 | European Pat. Off. . |
| 2 530 046 | 1/1984 | France . |
| 2 738 930 | 3/1997 | France . |
| 25 37 577 | 3/1977 | Germany . |
| 04143198 | 5/1992 | Japan . |

*Primary Examiner*—Peter M. Poon
*Assistant Examiner*—Tran Dinh
*Attorney, Agent, or Firm*—Browdy and Neimark

[57] ABSTRACT

A passive device for stabilizing the pointing direction of a spacecraft of the type comprising a pair of panels that are symmetrical about a gyroscopic stabilization axis, each panel having an auxiliary flap that is at least partially reflecting. Each of the auxiliary flaps is spaced apart from the plane of the corresponding panel and is disposed relative thereto in such a manner that during rotation of the spacecraft about the stabilization axis the area of the flaps that is illuminated by the sun's rays emitted along the solar ray direction $Z_s$ is modulated during rotation by the shadow of the corresponding panel.

8 Claims, 7 Drawing Sheets

PASSIVE DEVICE FOR STABILIZING THE DIRECTION IN WHICH A SPACECRAFT POINTS

FIELD OF THE INVENTION

The present invention relates to a passive device for stabilizing the pointing direction of a spacecraft, in particular a spacecraft placed on a solar orbit for which disturbances of solar origin are of considerable influence.

The invention applies more particularly to spacecraft that are gyroscopically stabilized about a given axis $Z_s$.

BACKGROUND OF THE INVENTION

Satellites are already known which are provided with reflecting panels, for example solar panels, which are illuminated by the sun, with such panels generating a force normal to their surfaces when they are illuminated by the sun.

U.S. Pat. No. 4,325,124 (ORGANISATION EUROPEENE DE RECHERCHES SPATIALES) thus describes the rotation of solar panels illuminated by the sun to compensate disturbing torques which exist on geostationary satellites.

French patent application FR 2 530 046 (MATRA) relates to a method and apparatus for controlling the attitude of a geosynchronous satellite. The satellite, which is gyroscopically stabilized by an inertia wheel, is provided with two rotary wings carrying solar panels, and each wing is provided with a fixed lateral winglet for compensation purposes.

French patent application FR 2 738 930 (MATRA MARCONI) relates to a satellite stabilized by rotation and implementing stabilization that is active by means of rotating solar panels provided with fixed winglets or stabilization that is passive by means of winglets fixed to the body of the satellite.

OBJECTS AND SUMMARY OF THE INVENTION

The present invention seeks to provide stabilization that is preferably completely passive, relying on modulating the surface areas that are illuminated by the sun, and thus by modulating the solar force that is exerted on the satellite.

The invention thus provides a passive device for stabilizing the pointing direction of a spacecraft of the type comprising a pair of panels, typically solar panels, that are symmetrical about a gyroscopic stabilization axis, each panel having an auxiliary flap that is at least partially reflecting, wherein each of said auxiliary flaps is spaced apart from the plane of the corresponding panel and is disposed relative thereto in such a manner that during rotation of the spacecraft about said stabilization axis the area of the flaps that is illuminated by the sun's rays emitted along the solar ray direction $Z_s$ is modulated during rotation by the shadow of the corresponding panel.

The plane of the auxiliary flaps is perpendicular to said gyroscopic stabilization axis.

Alternatively, the plane of the auxiliary flaps forms an angle 90°-β with said gyroscopic stabilization axis.

Preferably, the device includes means for generating a torque tending to increase the spin rate of the spacecraft about said gyroscopic stabilization axis. Said additional means may be constituted by additional flaps that are fixed relative to the panels and/or by causing the panels to be inclined by a given angle about their longitudinal axis so that their plane is not perpendicular to said stabilization axis.

BRIEF DESCRIPTION OF THE DRAWINGS

Other characteristics and advantages of the invention appear more clearly on reading the following description, given with way of non-limiting example and with reference to the drawings, in which.

MORE DETAILED DESCRIPTION

Figure 1A:
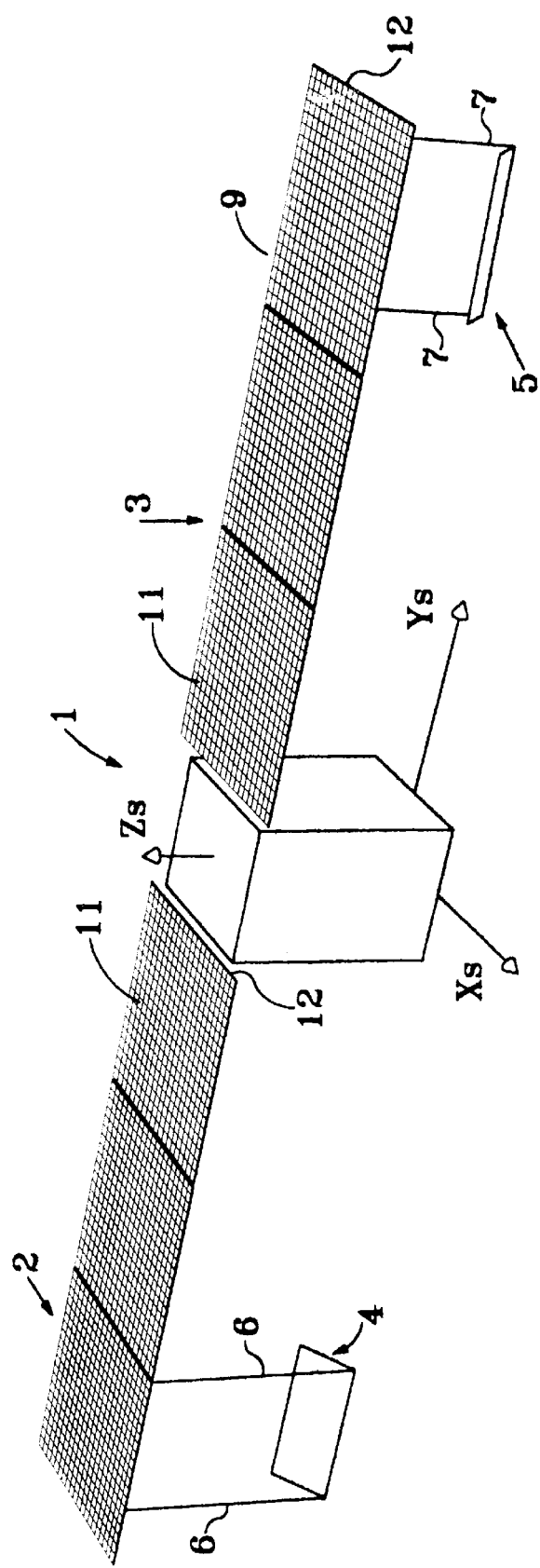
FIGS. 1a to 1d are respectively a perspective view, a side view, a front view, and a plan view of a device of the invention.
Figure 1B:
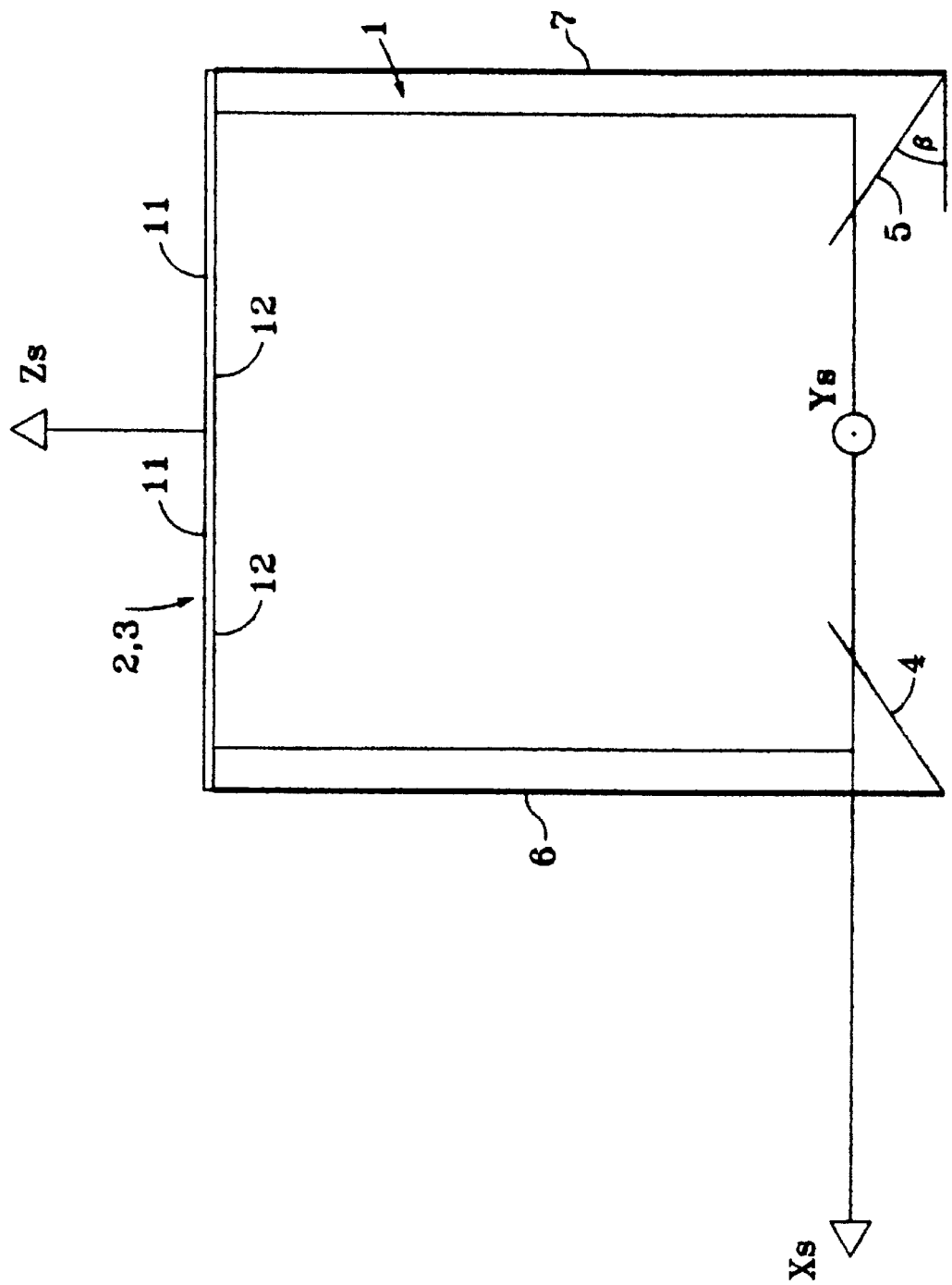
Figure 1C:
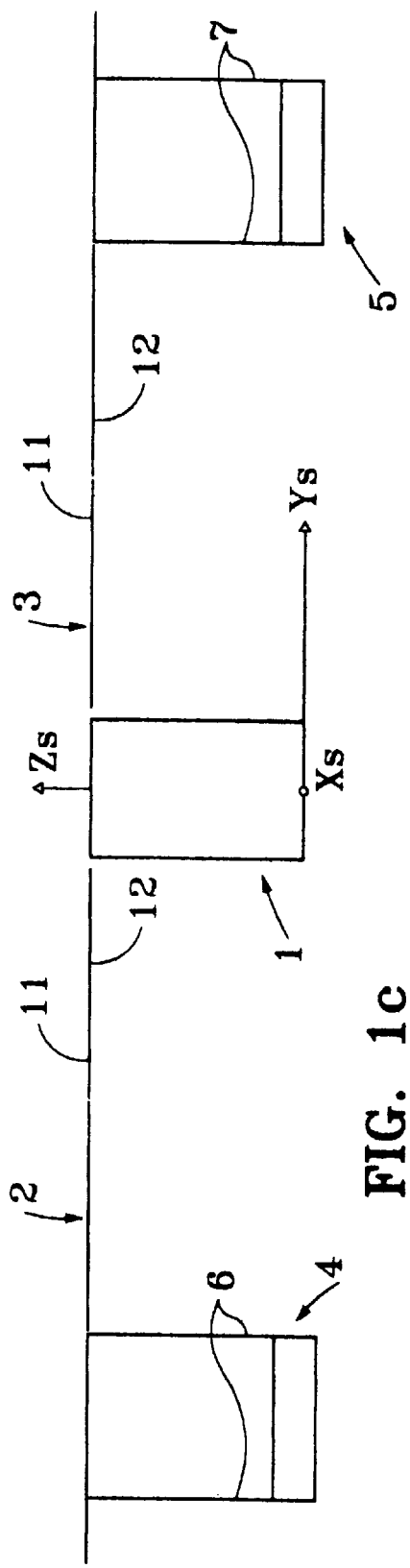
Figure 1D:
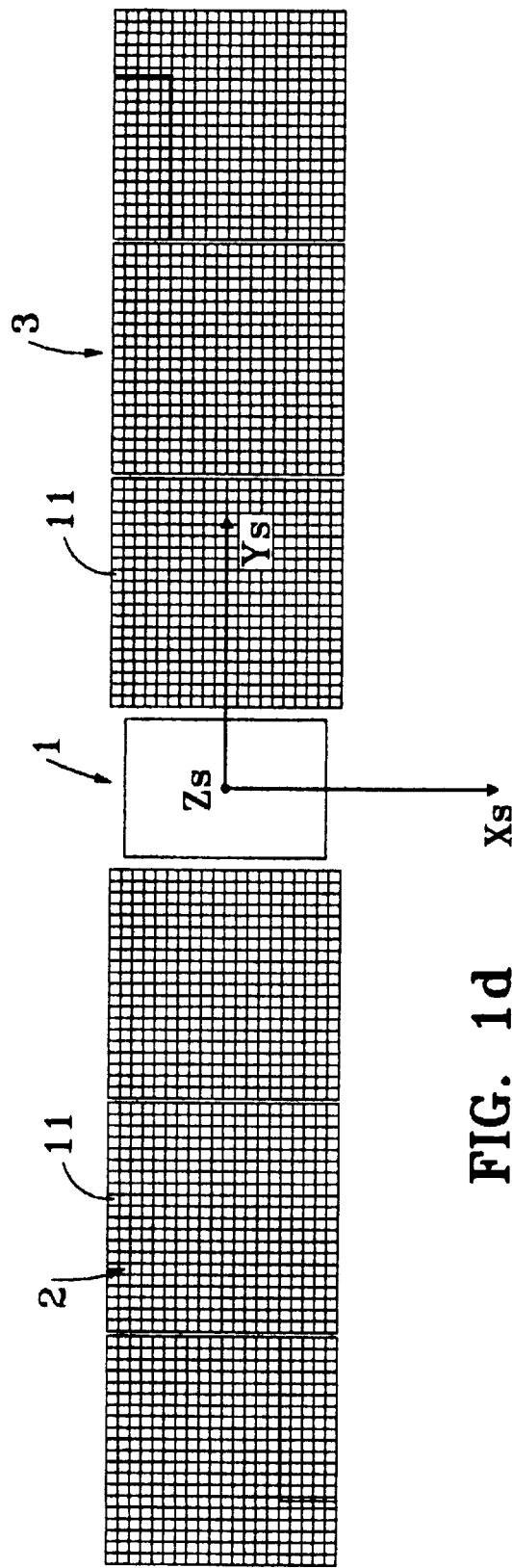

As shown in FIGS. 1a to 1d, a spacecraft 1, e.g. a satellite, has two solar panels 2 and 3 having a longitudinal axis extending along an axis $Y_s$ perpendicular to the axis $Z_s$ about which the satellite rotates and also known as the gyroscopic stabilization axis. The panels 2 and 3 define a plane normal to the gyroscopic stabilization axis with a face 11 facing towards the sun, and they receive the sun's rays perpendicularly to their surface when the axis $Z_s$ is parallel to the direction S to the sun. The angle α (see FIG. 3) which is the angle between the sun's rays and the axis $Z_s$, and which is referred to below as the "solar inclination" angle α, is then equal to zero. According to the invention, flaps 4 and 5 are provided which are spaced apart from the face 12 which is not exposed to the rays of the sun. These flaps 4 and 5 are fixed, for example, to the edges 8 and 9 of the respective panels 2 and 3 via lightweight elements (e.g. rods) 6 and 7 which may be perpendicular to the plane of the panels 2 and 3, for example. The flaps 4 and 5 are illuminated (partially or completely) in alternation when the axis $Z_s$ is no longer pointed towards the sun. The plane of each flap is parallel to the axis $Y_s$ of the satellite. It forms an angle β with the geometrical plane ($X_s$, $Y_s$) This angle β tends to decrease the speed of rotation of the satellite when the flaps 4 and 5 are illuminated by the sun, as is explained more fully below.

When the solar inclination angle α is zero, the auxiliary flaps 4 and 5 are completely in the shade of the solar panels 2 and 3. When the angle α is non-zero, the flaps 4 and 5 present a surface S which is subjected to the sun's rays. The area of this surface increases with increasing angle α, and it is modulated as a function of the angle of rotation θ of the satellite about the axis $Z_s$.

Figure 3:
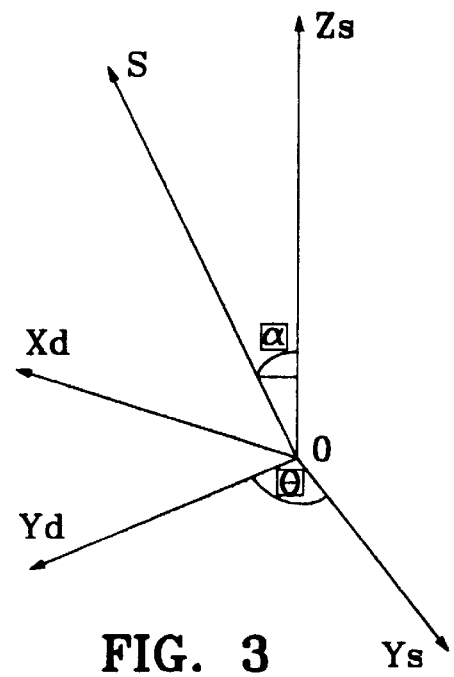
FIG. 3 shows how the system of three reference axes is defined.

FIG. 3 defines a frame of reference $OX_d$, $OY_d$, $OZ_s$ in which the axis $Y_d$ is perpendicular to the axis $Z_s$ and is situated in the plane containing the axis $Z_s$ and the axis OS parallel to the sun's rays. The axis $X_d$ completes this frame of reference. In this reference frame, the angle θ is defined as being the angle between the axes $OY_s$ and $OY_d$.

At a given instant, and thus for a given value of the angle θ, only one of the flaps 4 and 5 is illuminated, i.e. the flap which is situated in the half-plane containing the half-axis $OX_d$. In FIG. 4d, the illuminated area (in m²) of the flap surface S is plotted up the ordinate as a function of the angle θ (in °). It can thus be seen that the additional force induced by solar pressure acts always on this half-plane, which on average produces a torque about the axis $OY_d$. This torque about the axis $OY_d$ tends to redirect the axis $OZ_s$ towards the sun by the gyroscopic effect, thereby tending to reduce the solar inclination angle α towards zero.

Figure 2A:
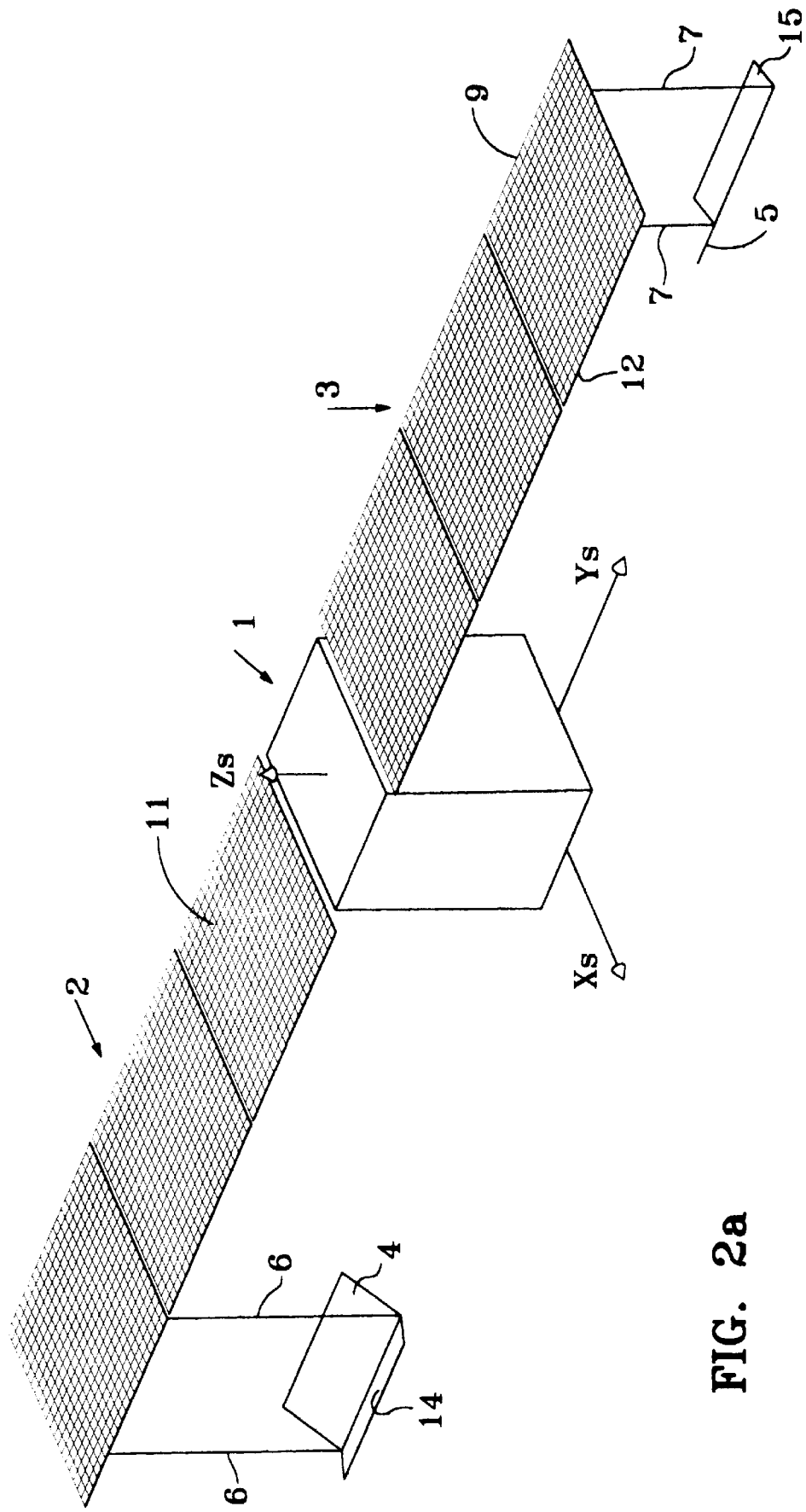
FIGS. 2a to 2c show embodiments of the additional device, either by implementing additional flaps attached to the stabilization flaps (FIG. 2a) and/or independent thereof (FIG. 2b) and/or by inclining the panels (FIG. 2c)
Figure 2B:
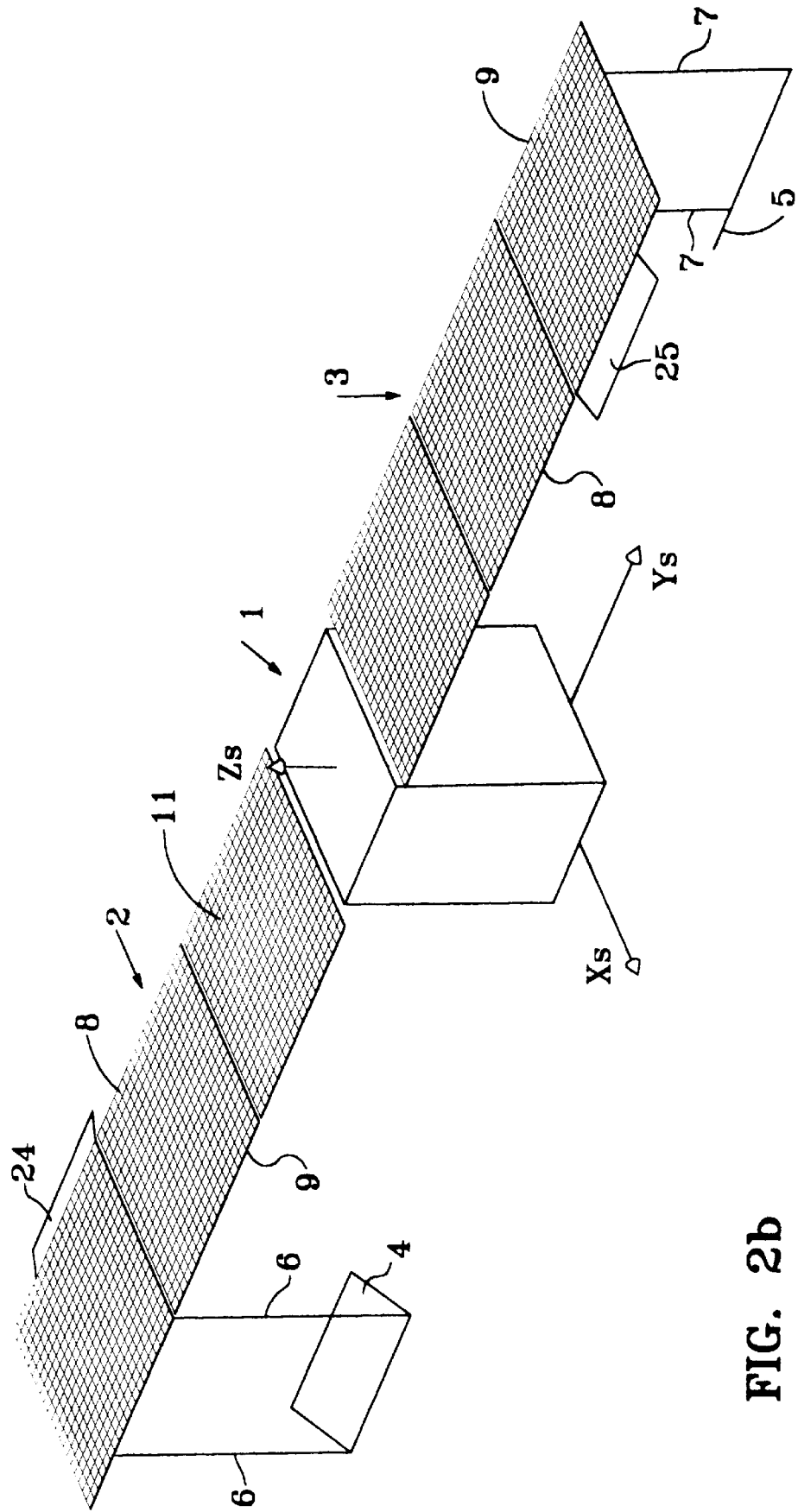
Figure 2C:
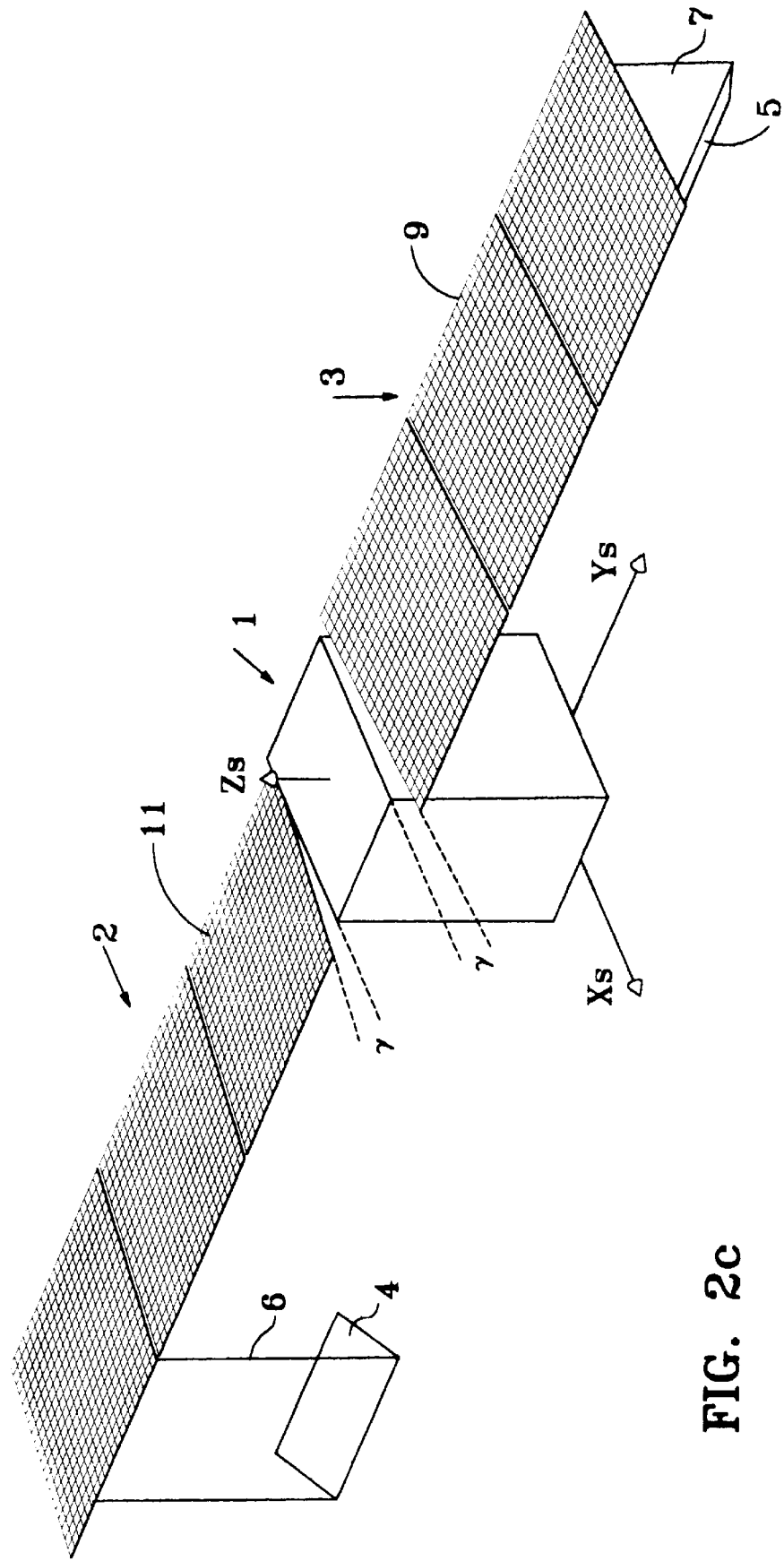

Relative to a plane normal to the axis $OZ_s$, the flaps 4 and 5 form an angle β which induces a torque about the axis $OZ_s$, said torque tending to reduce the angular velocity of the satellite about the axis $OZ_s$. Given that the illuminated area of the flaps 4 and 5 increases with increasing angle α, the torque generated by the flaps 4 and 5 also increases in absolute value. Furthermore, an additional device such as those shown in FIGS. 2a to 2c makes it possible to generate torque about the axis $OZ_s$ which tends to increase the angular velocity dθ/dt about the axis $OZ_s$. In the embodiment of FIG. 2a, flaps 14 and 15 are fixed on the elements 6 and 7 but are opposite to the flaps 4 and 5 (for example symmetrical thereto about the elements 6 and 7) so as to form therewith dihedral angles that are upwardly directed in the figure. In the embodiment shown in FIG. 2b, the flaps 24 and 25 are fixed to the edge 8 respectively of the panel 2 and of the panel 3. In the example shown, they are inclined away from the face 11 that is directed towards the sun. In the embodiment of FIG. 2c, the panels 2 and 3 are inclined at respective angles +γ and -γ relative to the plane ($OX_s$, $OY_s$) about the axis $OY_s$, so as to form angles similar to those of a propeller.

If the angle of inclination α is zero, the only torque which exists is torque tending to increase the angular velocity dθ/dt, which torque is generated by the additional device. An increase in the angle α then tends to produce a torque which is generated by the flap (β≠0) and which tends to reduce the angular velocity dθ/dt. There exists an equilibrium angle $α_e$ where the two effects cancel. If α is greater than $α_e$, the torque generated by the flaps is preponderant, and tends to reduce the angular velocity dθ/dt, but also to reduce the value of α.

Numerical Example

Distance to sun: 1 Astronomical Unit.
Solar panels 2 and 3:
 width: 3.4 m
 position from O along $Y_s$: ±1.2 m to ±11.4 m.
Flaps 4 and 5:
 width: 1 m
 position from O along $Y_s$: ±8 m to ±10.4 m
 β=25°.

It is assumed that the flaps 4 and 5 are 100% reflecting. The force F (in Newtons N) exerted on said flap by solar pressure has the value:

$$F = 2Cs/C\ \cos^2\phi \cdot S$$

Cs it the solar constant. At a distance of 1 Astronomical Unit its value is about 1383 W/m².
c is the speed of light.
φ is the solar inclination angle of the flap.
S is the area of the illuminated surface.

The positive torque delivered by the additional geometrical device (14, 15, 24, 25, inclination γ) is chosen to be equal to 5.058×10⁻⁵ N·m.

Mean torques have been calculated for various angles α by integration over the angle θ. The results are shown in FIGS. 4a to 4c.

Figure 4A:
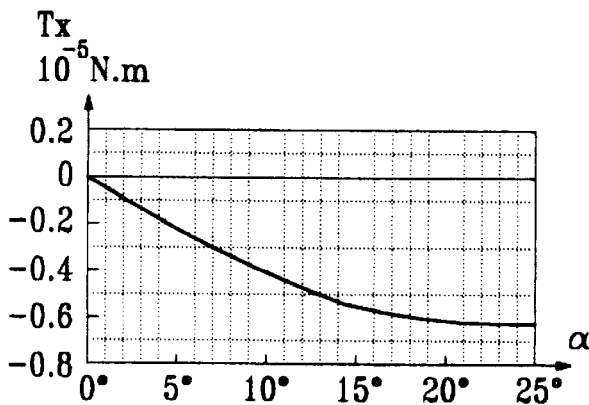
FIGS. 4a to 4d are curves representative of the torque induced by solar pressure about the axes $X_d$, $Y_d$, and $Z_s$ for FIGS. 4a to 4c, respectively, and the variation in illuminated area of one of the flaps as a function of the angle θ in FIG. 4d; curve 4c assumes there is a driving torque induced by one of the systems shown on FIGS. 2a to 2c.
Figure 4B:
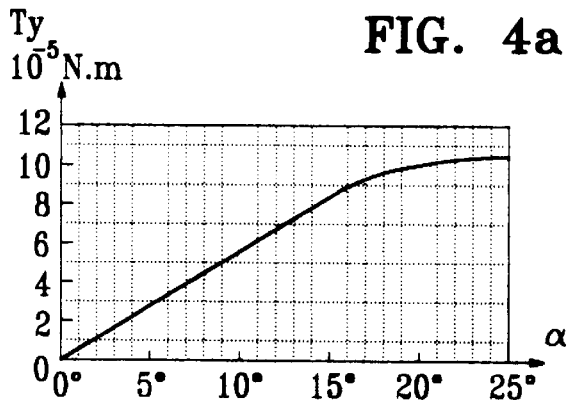
Figure 4C:
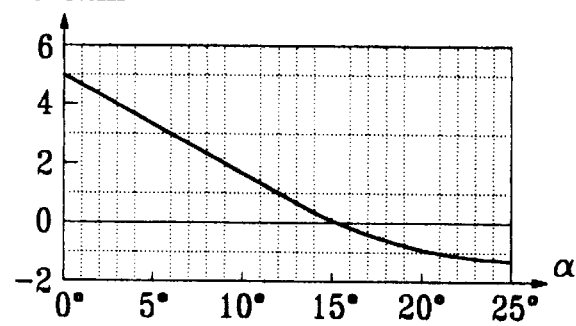
Figure 4D:
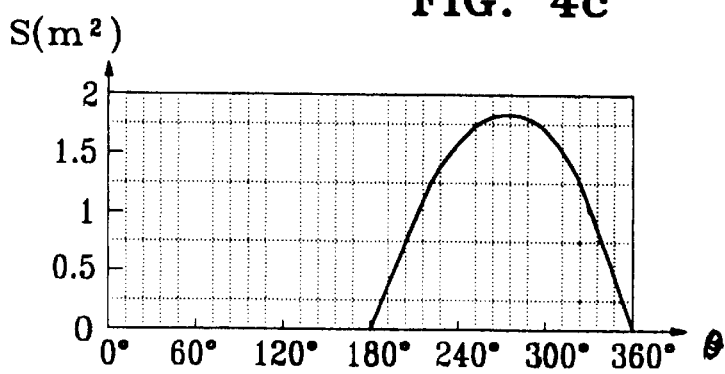

FIG. 4a shows the existence of an interfering torque $T_x$ about the axis $X_d$. This is due to the distance that exists between the flaps 4 and 5 and the respective panels 2 and 3.

As could be expected, the torque $T_y$ about the axis $Y_d$ has a positive slope and the torque $T_z$ about the axis $Z_s$ has a negative slope. FIG. 4c shows that the equilibrium angle $α_e$, at which $T_z$=0 has a value of 15° in this example.

It would also be observed that the curves are practically linear in the region 0°–15°, so the various curves can be approximated by the following functions:

$T_x = -5.57 \times 10^{-6}\ α/15$ $T_y = +8.604 \times 10^{-5}\ α/15$ $T_z = -5.058 \times 10^{-5}\ (α/15-1)$ where α is expressed in degrees and the torques are expressed in N·m.

Consider a frame of reference relative to the plane of the orbit. It comprises the vector N normal to the plane of the orbit, the vector S as mentioned above which designates the direction of the sun's rays, and the vector C making up the third direction of the system. The vectors $X_d$, $Y_d$, and $Z_s$ can be expressed using two angle parameters, namely the above-mentioned angle α and the angle φ which expresses the rotation of the frame of reference ($X_d$, $Y_d$, $Z_s$) about the sun direction S.

Then:

$X_d = (\cos α, \sin φ, 0)$ $Y_d = (-\cos α \sin φ, \cos α \cos φ, \sin α)$ $Z_s = (-\sin α \sin φ, -\sin α \cos φ, \cos α)$ Calculation shows that the equilibrium obtained in this way is stable. In particular:

$\tan φ_e = T_{xe}/(T_{ye} \cos α_e)$ $H_e = -T_{ye}/(ω \cos φ_e)$ (where $T_{xe}$, $T_{ye}$, $α_e$, $φ_e$, and $H_e$ designate the values of $T_x$, $T_y$, α, φ, and H at equilibrium).

H designates the moment of inertia of the spacecraft.
ω designates the angular velocity of the satellite on its orbit.

For a circular orbit of radius R equal to 1 Astronomical Unit:

ω = 1.99×10⁻⁷ radians per second which in the present example gives:

$φ_e = 176.17°$ $H_e = 432.8$ m·N·s.

In addition, stable attitude correction can be obtained for any elliptical solar orbit satisfying Kepler's law (ωR² = constant). The value of the torque at equilibrium $T_{ye}$ ($T_{ye} = H_e \cos φ_e \cdot ω$) is proportional to ω and thus to 1/R², and this variation law is the same as that for the torque produced by solar intensity, which likewise varies as 1/R².

The device of the invention thus makes passive attitude correction possible, and in the preferred embodiment, passive correction simultaneously of the attitude and the spin rate of the satellite, in an equilibrium that is stable.

What is claimed is:

1. A passive device for stabilizing a pointing direction of a spacecraft comprising a pair of panels that are symmetrical about a gyroscopic stabilization axis, each panel having a stationary auxiliary flap that is at least partially reflecting, wherein each of said auxiliary flaps is spaced apart from a plane of a corresponding of said pair of panel and is disposed relative thereto in such a manner that during rotation of the spacecraft about said stabilization axis a area of the flaps that is illuminated by the sun's rays emitted along a solar ray direction $Z_s$ is modulated during rotation by a shadow of the corresponding panel.

2. A device according to claim 1, wherein a plane of a auxiliary flaps is perpendicular to said gyroscopic stabilization axis.

3. A device according to claim 1, wherein a plane of the auxiliary flaps forms an angle 90°-β with said gyroscopic stabilization axis.

4. A device according to claim 1, including means for generating a torque tending to increase the spin rate of the spacecraft about said gyroscopic stabilization axis.

5. A device according to claim 4, wherein said means include compensating flaps spaced apart from and fixed relative to the panels.

6. A device according to claim 5, wherein said compensating flaps are secured adjacent to stabilizing flaps.

7. A device according to claim 5, wherein said compensating flaps are secured adjacent to the panels.

8. A device according to claim 4, wherein said means for generating torque include inclining at least a portion of the panels by a given angle $\gamma$ about a longitudinal axis $OY_s$ thereof such that the planes of the panels are not perpendicular to said stabilization axis.

* * * * *